(No Model.)
J. D. LIBEY.
TWO WHEELED VEHICLE.
No. 300,377. Patented June 17, 1884.
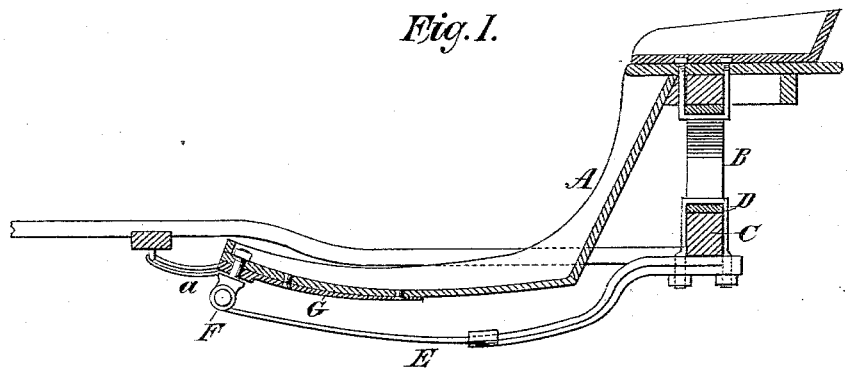
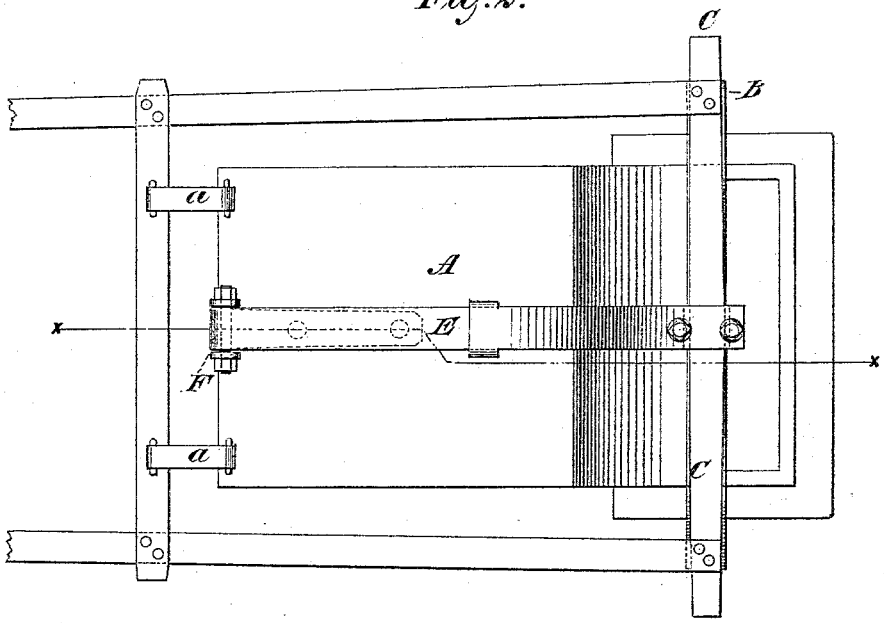
WITNESSES:
Gustave Dieterich
Chas L. Cohn
INVENTOR
J. D. Libey
By Geo. M. Hopkins
ATTORNEY

UNITED STATES PATENT OFFICE.

JOHN D. LIBEY, OF LIMA, INDIANA.

TWO-WHEELED VEHICLE.

SPECIFICATION forming part of Letters Patent No. 300,377, dated June 17, 1884.

Application filed January 19, 1884. (No model.)

*To all whom it may concern:*

Be it known that I, JOHN D. LIBEY, a citizen of the United States, residing in Lima, in the county of La Grange and State of Indiana, have invented a new and Improved Vehicle-Spring; and I do hereby declare that the following is a full, clear, and exact description thereof, reference being had to the accompanying drawings, forming a part of this specification.

This invention relates to that class of two-wheeled vehicles in which an auxiliary spring is employed to counteract or diminish the rocking motion communicated to the body of the vehicle by the movements of the horse; and it consists in certain details of construction, by means of which special simplicity is obtained without impairing the efficiency of the operation of the parts.

In the drawings, Figure 1 represents a vertical longitudinal section of the body portion of a vehicle having my improvements applied thereto, the same being taken on the line X X, Fig. 2; and Fig. 2, an inverted plan of the same.

A represents the body portion of the vehicle, and B an elliptical spring, the upper half of which is strongly secured thereto in any proper manner.

C represents the axle, and D a clip, by means of which the lower half of the spring B is secured to the top of the same, as shown.

E represents a leaf-spring, the rear end of which is secured to the center of the axle by means of the clip D, before referred to, and the front end of which is pivoted to the vehicle-body by means of a double eyebolt, F, as shown.

G represents a strengthening-plate secured to the body of the vehicle, through which the shank of the eyebolt passes.

The elliptical spring B, it will be observed, is located in line above the axle in such manner that the point of attachment of the spring and axle is at the center of each. The rear end of the auxiliary spring also is attached to the center of the axle, the single clip D being employed to unite both springs to the latter. The auxiliary spring E, it will be understood, serves to counteract or diminish the rocking motion communicated to the body of the vehicle by the movements of the horse. By means of the described construction, the result desired is obtained with but few parts, a single supporting-spring, a single fastening-clip, and a single auxiliary spring only being employed in connection with the body of the vehicle. It is possible to employ a single clip to secure both springs by arranging the parts so that the point of attachment of each is at the center of the axle.

Having thus fully described my invention, what I claim as new, and desire to secure by Letters Patent, is—

In combination with the body A, the single elliptical supporting-spring B, the single clip D, the single auxiliary spring E, and double eyebolt F, the clip D uniting both the supporting-spring and auxiliary spring to the axle, as described.

JOHN D. LIBEY.

Witnesses:
J. A. SHOUP,
E. B. McDONALD,
W. T. FAVOURITE.